United States Patent
Suzuki et al.

[11] Patent Number: 5,537,092
[45] Date of Patent: Jul. 16, 1996

[54] HELMET DISPLAY INCLUDING AN INFORMATION DISPLAY HORIZONTALLY ALIGNED IN A SPACED RELATION ALONG A CURVATURE OF A HELMET JAW

[75] Inventors: Yoshiyuki Suzuki; Youichi Arai, both of Shizuoka, Japan

[73] Assignee: Yazaki Corporation, Tokyo, Japan

[21] Appl. No.: 234,610

[22] Filed: Apr. 28, 1994

Related U.S. Application Data

[63] Continuation of Ser. No. 36,839, Mar. 25, 1993, abandoned.

[30] Foreign Application Priority Data

Mar. 27, 1992 [JP] Japan ...................................... 4-071338

[51] Int. Cl.$^6$ ........................................................ B62J 3/00
[52] U.S. Cl. ............................ 340/461; 340/525; 340/432
[58] Field of Search ...................................... 340/432, 980, 340/485, 425.5, 438, 439, 525, 573; 362/80.1, 83.1; 345/8

[56] References Cited

U.S. PATENT DOCUMENTS

| | | | |
|---|---|---|---|
| 4,283,798 | 8/1981 | Kuehn | 340/573 |
| 4,647,901 | 3/1987 | Teshima | 340/461 |
| 4,949,072 | 8/1990 | Comerford | 340/525 |
| 5,072,209 | 12/1991 | Hori | 340/461 X |

FOREIGN PATENT DOCUMENTS 2238627  6/1991  United Kingdom .................. 340/705

*Primary Examiner*—Hezron E. Williams
*Assistant Examiner*—Christine K. Oda
*Attorney, Agent, or Firm*—Finnegan, Henderson, Farabow, Garrett & Dunner

[57] ABSTRACT

A helmet display for displaying information to a user thereof while the user is riding, for example, a motorcycle. A display mounted on a helmet includes a plurality of display elements horizontally aligned in a spaced relation along the curvature of the jaw of the helmet. A reflector reflects the images of the display elements into the eyes of a user wearing the helmet. The images of the display elements form as a whole information to the user. The reflector may be a reflective surface provided at a lower portion on the shield of the helmet. The reflector may be mounted on the upper portion of the jaw and the reflective surface thereof may have a curvature substantially the same as that of the jaw of the helmet.

20 Claims, 5 Drawing Sheets

F I G. 5A 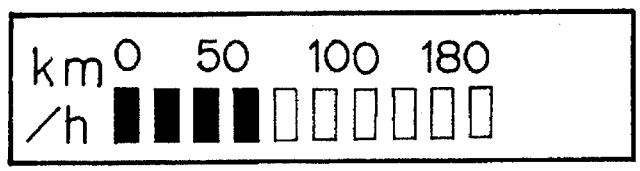
F I G. 5B 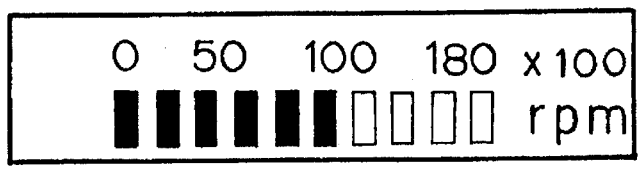
F I G. 5C 
F I G. 5D 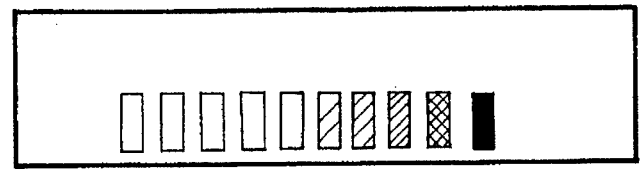

5,537,092

HELMET DISPLAY INCLUDING AN INFORMATION DISPLAY HORIZONTALLY ALIGNED IN A SPACED RELATION ALONG A CURVATURE OF A HELMET JAW

This application is a continuation, of application Ser. No. 08/036,839, filed Mar. 25, 1993, now abandoned.

BACKGROUND OF THE INVENTION

1. Field of the Invention

The present invention relates to a helmet display in which a display is disposed on the jaw of the helmet and a driver wearing the helmet sees a virtual image behind a reflector such as the shield of the helmet or a combiner which reflects the image of the display into the driver's eyes.

2. Prior Art

There has been a conventional display called a head-up display used in an automotive vehicle. A display is disposed on the dashboard of a vehicle and the image of the display is reflected by a reflector disposed on the windshield into a driver's eyes, so that the driver sees the virtual image of the display behind the reflector. The image appears on the windshield through which the driver sees the outside of the vehicle while driving. This is advantageous in that the driver only needs to slightly move his eyes in order to look at the image. FIG. 7 shows this type of head-up display which is referred to as a helmet display and is built in a helmet for a motorcycle driver. The helmet display is provided with a display 13 on the interior of a jaw 2 of the helmet 1. The display 13 is so positioned that the display 13 projects its image upwardly towards the shield 4. The shield 4 reflects the image into the driver's eyes. The driver sees a virtual image Xo of the display behind the shield 4.

FIG. 8 shows another conventional helmet display. The image of the display is not reflected by the shield 4 but is reflected by a combiner 15 mounted on the upper portion of the jaw 2 of the helmet 1. The light reflected by the combiner 15 enters the driver's eyes. The driver sees a virtual image Xo the display behind the combiner 15. The display 23 includes a liquid crystal 25 with a back light 24 and the image of the display 23 is enlarged by a lens 26. Thus, the driver sees the virtual image Xo as being a long way from the driver. The conventional helmet displays in FIGS. 7 and 8 have advantages similar to those of the headup display used for conventional four-wheel vehicles. The display moves with the driver's face, so that the information such as vehicle speed and engine speed is always displayed at an optimum position for the driver to see.

However, the aforementioned helmet displays have a single flat screen for displaying the image and therefore the reflective surface of the reflector must also be flat so that the image seen by the driver is not distorted. Thus, the shield 4 in FIG. 7 must have a flat surface. This requirement of a flat surface may result in an ugly or uncommon appearance of the helmet. Meanwhile, the helmet in FIG. 8 needs no flat surface of the shield 4 since the helmet has a combiner as a reflector. However, the combiner is located very close to the driver's face and causes inconvenience if the driver wears glasses.

SUMMARY OF THE INVENTION

An object of the present invention is to provide a helmet display with a compact display mounted thereon while maintaining the common appearance of a helmet.

A helmet display displays information to a user thereof while the user is riding, for example, a motorcycle. A display mounted on a helmet includes a plurality of display elements horizontally aligned in a spaced relation along the inner curvature of the jaw of the helmet. A reflector reflects the images formed by the display elements into the eyes of a user wearing the helmet. The images of the display elements are perceived by the driver as forming information to the driver as a whole. The reflector may be a reflective surface provided at a lower portion of the shield of the helmet. The reflector may be mounted on the upper portion of said jaw and the reflective surface thereof may have a curvature substantially the same as that of the jaw of the helmet.

BRIEF DESCRIPTION OF THE DRAWINGS

Features and other objects of the present invention will become more apparent from the detailed description of the preferred embodiments with reference to the accompanying drawings in which:

FIGS. 5A–5D show actual displays of a helmet display according to the invention;

DETAILED DESCRIPTION OF THE INVENTION

Construction

Preferred embodiments of the present invention will now be described in detail with reference to the drawings. Elements similar to the prior art helmet have been given the same references.

Figure 1:
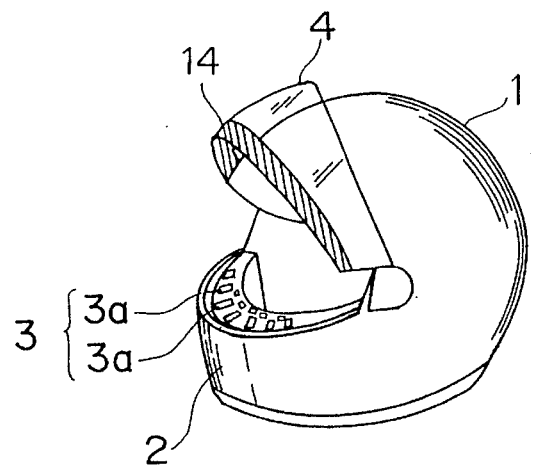
FIG. 1 is a perspective view of a first embodiment of a helmet display according to the present invention.

FIG. 1 is a perspective view of a first embodiment of a helmet display according to the present invention. A display 3 for displaying vehicle conditions such as engine speed and vehicle velocity is made up of a plurality of LEDs 3a. The LEDs are horizontally aligned in a spaced relation along the inner curvature of a jaw 2 of the helmet 1. A shield 4 is provided with a reflective surface 4a. One type of reflective surface of the shield 4 is high reflection where the reflective surface 14 reflects most of a light incident thereupon. This type of reflective surface is provided at a lower part of the shield 4 where the driver's visibility is not disturbed while he rides a motorcycle. Another type of reflective surface 14 is gradation where the light conductivity of the shield 4 gradually varies so that the part closer to the lower edge of the shield 4 is more reflective than the other. Thus, the driver is able to see through the part away from the lower edge of the shield 4.

Figure 2:
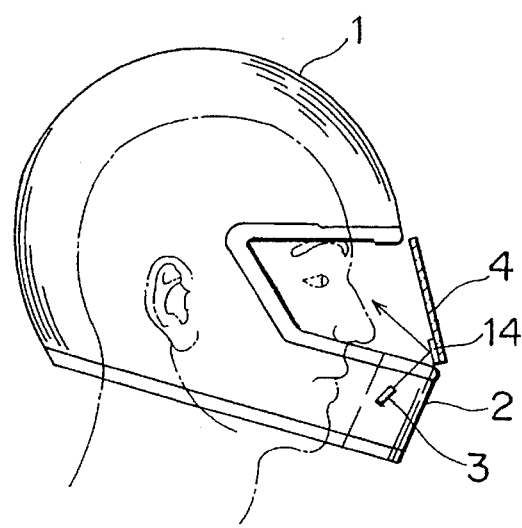
FIG. 2 is a side view of the helmet display of FIG. 1.

FIG. 2 is a side view of the helmet display of FIG. 1 when the driver wears the helmet. Strictly speaking, the shield 4 is vertically curved but is shown more like a flat surface for simple explanation. When the LEDs 3a light up, the reflective part 4a of the shield 4 reflects the lights into the driver's eyes. The driver sees the a virtual image of the lights so that the driver perceives the image behind the shield 4. FIGS. 5A–5D show images on the display 3 which are formed of a plurality of LEDs 3a and are seen by the driver. For example, FIG. 5A shows that the driver is cruising at a vehicle velocity of about 65 km/h and FIG. 5B shows that the engine speed is about 10,000 rpm. The display 3 is controlled by a controller, not shown, which receives information on the vehicle conditions such as vehicle velocity and engine speed, and sends the information to the display 3. The controller is provided with a selector switch with which the driver is able to selectively see either the vehicle velocity or engine speed on the reflective surface.

Operation

Figure 4:
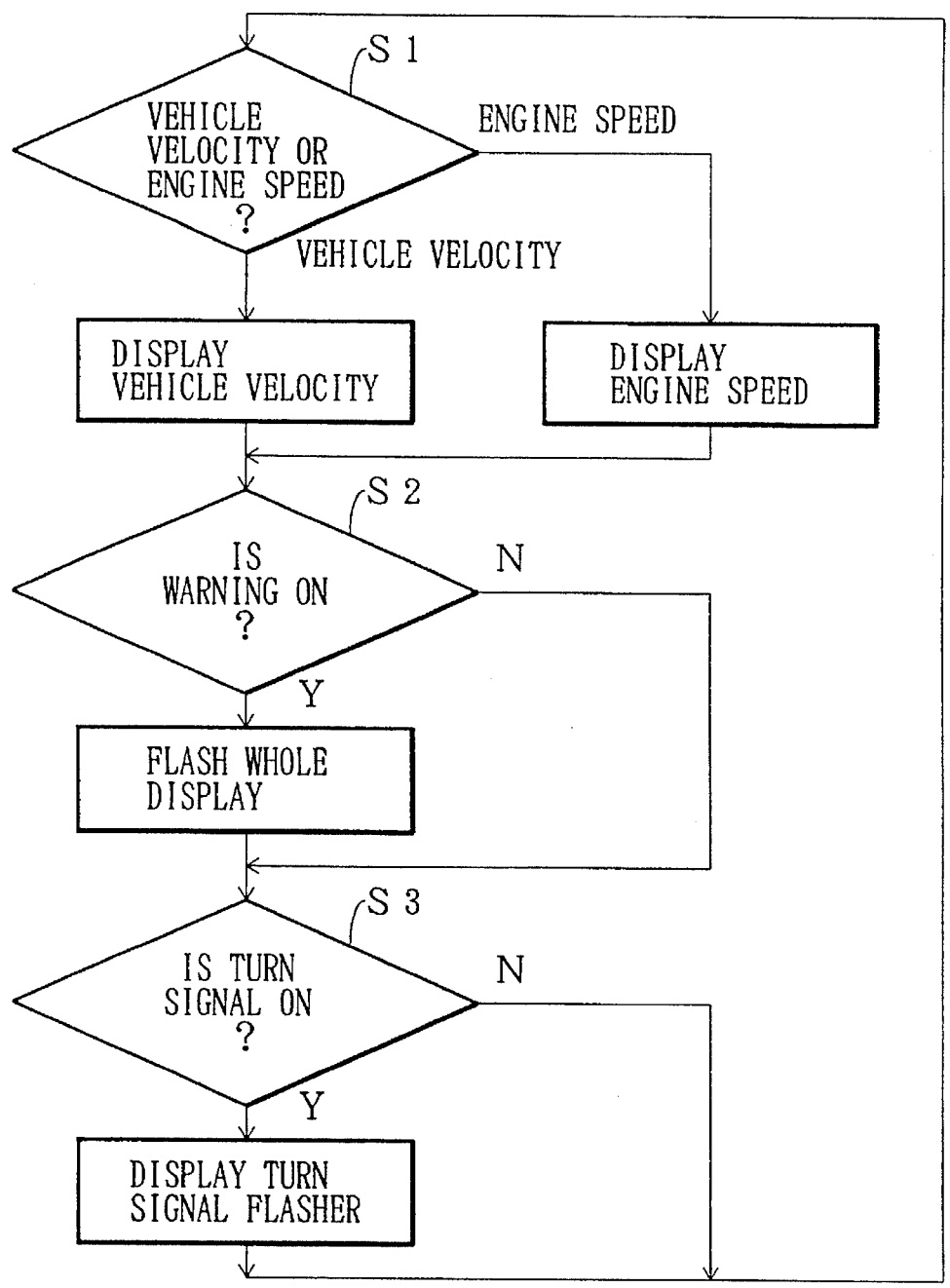
FIG. 4 is a flowchart illustrating the operation of the helmet display shown in FIGS. 1 and 3.

The operation of the helmet display in FIG. 1 is now described with reference to FIG. 4. When the driver operates the selector switch, the controller makes a decision to determine at step 1 S1 which one of the vehicle velocity and the engine speed is to be displayed. If the vehicle velocity is selected, then a display as shown in FIG. 5A appears. If the engine speed is selected, then a display as shown in FIG. 5B appears. The characters and rectangular segments in FIGS. 5A and 5B are formed of LEDs. The characters remain lit all the time during the use of the helmet. The rectangular segments are lit in accordance with the vehicle conditions so that the number of consecutive segments that are lit becomes a bar graph to indicate the velocity and engine speed.

At step 2 S2, the controller checks for warning signals indicative of, for example, fuel run out and oil run out. When the controller detects a warning signal, all the LEDs 3a simultaneously cycle on and off rapidly as shown in FIG. 5C. Then, at step 3 S3, the controller checks for a flasher signal. If the flasher signal indicates a right turn, the controller causes the LEDs on the right half side to glow such that the right LED of any adjacent two LEDs is brighter than the left LED. This arrangement has an advantage of preventing the driver from forgetting to turn off the turn signal after right turning. When the flasher signal indicates a left turn, the operation is reverse. If a warning signal is not present nor is a turn signal, then either the vehicle velocity or the engine speed is displayed on the display 3.

Figure 6A:
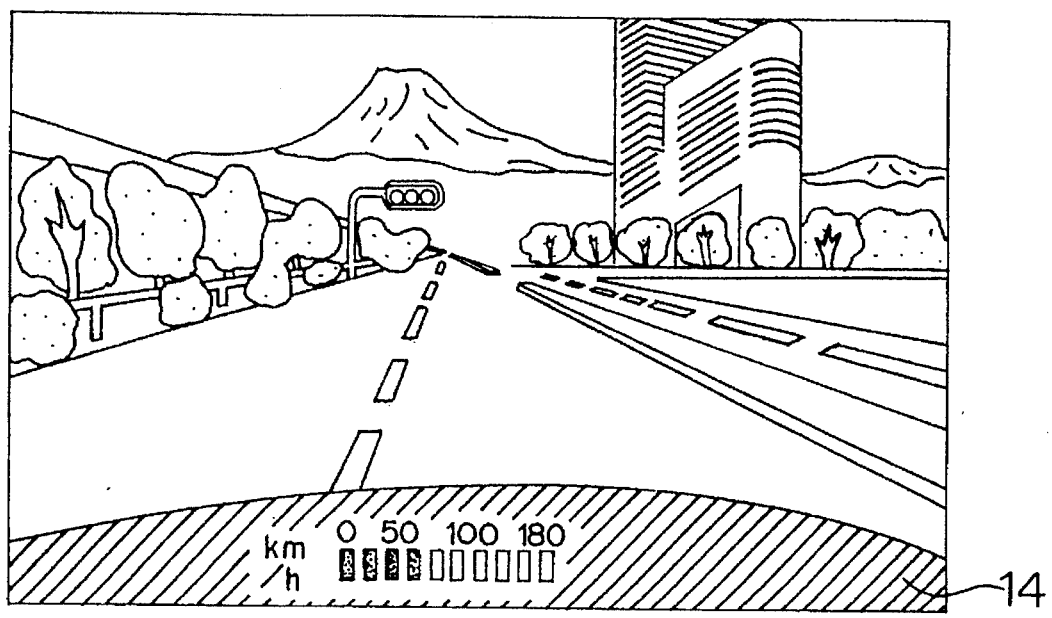
FIG. 6A shows a display on a high reflection shield and the external view seen from inside the helmet, and FIG. 6B showing a display on a gradation reflection shield and the external view seen from inside the helmet.
Figure 6B:
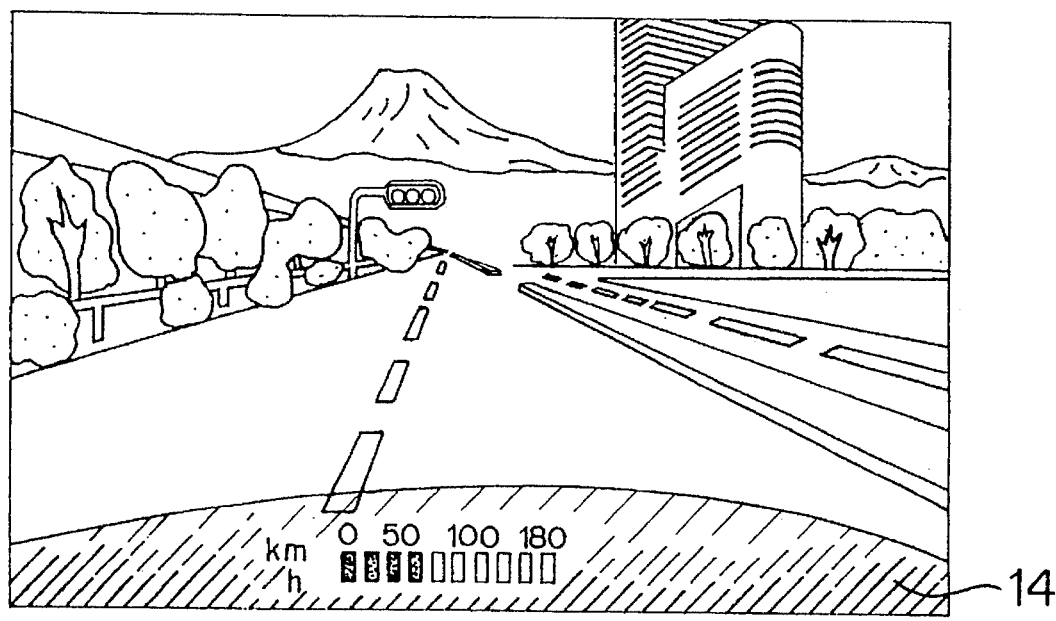
Figure 7:
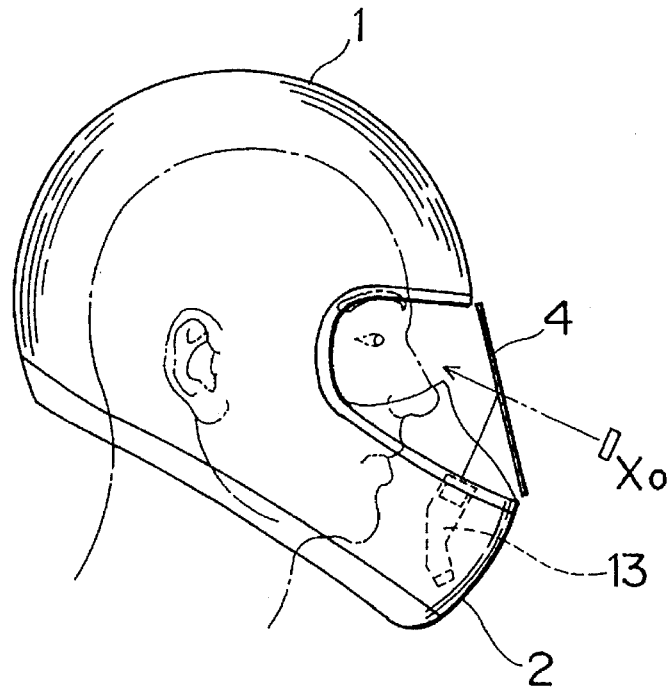
FIG. 7 is a side view of a conventional helmet display with a reflective shield surface.
Figure 8:
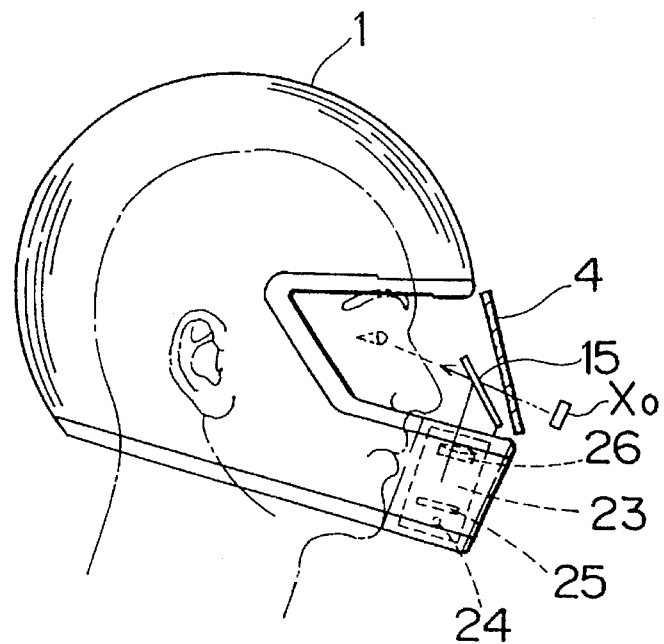
FIG. 8 is a side view of another conventional helmet display with a combiner.

As shown in FIG. 6A, a highly reflective surface 14 of the shield 4 does not permit the driver to see through the reflective surface 14 which shows a vehicle speed of about 60 km/h. The hatched area in FIG. 6A represents the highly reflective surface 14. The reflective surface 4a reflects the image produced by the LEDs 3a as a high contrast image. In contrast, a gradation reflective surface 14 of the shield 4 permits the driver to see through a less reflective portion of the surface 14 as shown in FIG. 6B. It should be noted that the center line of the road is seen through the less reflective portion. Thus, the gradation reflective surface will not seriously disturb the driver's visibility.

Figure 3:
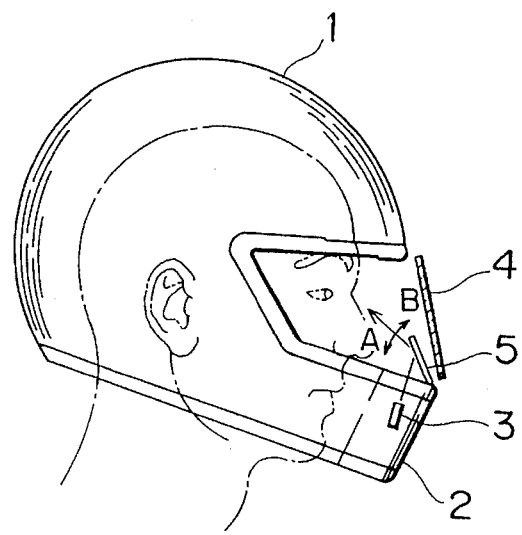
FIG. 3 is a side view of a second embodiment of a helmet display according to the invention.

FIG. 3 is a side view of a second embodiment of a helmet display according to the invention. The shield 4 has no reflective surface. A separate plate-like reflector called a combiner 5 is used in place of the reflective surface 14 of the shield 4. The combiner 5 has a curvature substantially the same curvature as the jaw 2, and is mounted to the upper portion of the jaw 2. This arrangement is advantageous in that the driver is able to see the display even when the shield is lifted as well as the driver is not disturbed his visibility when the driver wears glasses. The combiner 5 can be adjustably tilted either in the direction of A or in the direction of B as shown such that the display image moves up and down and is suitable for a compact design of the helmet.

What is claimed is:

1. A helmet display for displaying information to a user of a helmet, the helmet having a jaw with top and bottom surfaces, the jaw having a first curvature with a length extending from a first side of the helmet to a second side opposite to the first side, the helmet display comprising:

a display mounted on the helmet, said display having a plurality of display elements in the top surface of the jaw and horizontally aligned in a spaced relation along substantially the length of the first curvature of the jaw of the helmet to provide an analog display; and a reflector for reflecting images of said display into eyes of the user wearing said helmet, said images of display elements forming information to the user.

2. The helmet display according to claim 1, wherein said reflector has a reflective surface having a second curvature substantially equal to said first curvature of said jaw of the helmet, and said reflector is mounted on an upper portion of said jaw.

3. The helmet display according to claim 2, wherein said helmet includes a shield, and said reflector is a reflective surface provided on a lower portion of said shield.

4. The helmet display according to claim 2, wherein said reflector is a combiner mounted on the upper portion of the jaw of the helmet.

5. The helmet display according to claim 4, wherein said combiner is tiltably mounted on the jaw.

6. The helmet display according to claim 1, wherein said display elements are light emitting elements, and said images form a graph to display the information.

7. The helmet display according to claim 1, wherein the reflector includes a reflective surface equally spaced from each of the plurality of display elements.

8. A helmet display for use in displaying information to a user of a helmet, the helmet having a jaw with a first curvature having a length extending from a first side of the helmet to a second side opposite to the first side, the helmet display comprising:

a displayed fixed to the jaw of the helmet residing within and along substantially the length of the first curvature of the jaw for providing an analog display of information; and a shield fixed to the helmet, the shield including a reflective surface having a second curvature substantially equal to the first curvature, wherein the reflective surface reflects the information from the display into eyes of the user.

9. The helmet display of claim 8, wherein the display includes a plurality of light emitting elements horizontally aligned in a spaced relation along the first curvature.

10. The helmet display of claim 9, wherein the reflective surface is a high reflection surface for reflecting substantially most light incident thereon, the high reflection surface being positioned at a lower part of the shield.

11. The helmet display of claim 9, wherein the reflective surface is a gradation surface for reflecting more light at a lower part of the shield than at an upper part of the shield.

12. The helmet display according to claim 8, wherein the display includes a plurality of display elements that are equally spaced from the reflective surface.

13. The helmet display according to claim 7, wherein the display includes a plurality of light emitting display elements, and the reflective surface reflects images forming a graph to display the information.

14. A helmet display for use in displaying information to a user of a helmet, the helmet having a jaw with a first curvature having a length extending from a first side of the helmet to a second side opposite to the first side, the helmet display comprising:

a display fixed to the jaw of the helmet residing within and along substantially the length of the first curvature of the jaw for displaying information; and a reflective surface fixed to an upper part of the jaw, the reflective surface having a second curvature substantially equal to the first curvature, wherein the reflective surface reflects the information from the display into eyes of the user.

15. The helmet display of claim 14, wherein the display includes a plurality of light emitting elements horizontally aligned in a spaced relation along the first curvature.

16. The helmet display of claim 14, wherein the reflective surface is a combiner.

17. The helmet display of claim 16, wherein the combiner is tiltably mounted on the jaw.

18. The helmet display of claim 14, wherein the display includes a plurality of light emitting elements horizontally aligned in a spaced relation along the first curvature, and the reflective surface is a combiner tiltably mounted on the jaw.

19. A helmet display for use in displaying information to a user of a helmet, the helmet having a jaw with a first curvature having a length extending from a first side of the helmet to a second side opposite to the first side, the helmet display comprising:

a display fixed to the jaw of the helmet residing within and along substantially the length of the first curvature of the jaw for displaying information; and a shield fixed to the helmet, the shield including a reflective surface having a second curvature substantially equal to the first curvature, wherein the reflective surface reflects the information from the display into eyes of the user, the reflective surface being a high reflection surface for reflecting substantially most light incident thereon, the high reflection surface being positioned at a lower part of the shield.

20. A helmet display for use in displaying information to a user of a helmet, the helmet having a jaw with a first curvature having a length extending from a first side of the helmet to a second side opposite to the first side, the helmet display comprising:

a display fixed to the jaw of the helmet residing within and along substantially the length of the first curvature of the jaw for displaying information; and a shield fixed to the helmet, the shield including a reflective surface having a second curvature substantially equal to the first curvature, wherein the reflective surface reflects the information from the display into eyes of the user, the reflective surface being a gradation surface for reflecting more light at a lower part of the shield than that at an upper part of the shield.

* * * * *

UNITED STATES PATENT AND TRADEMARK OFFICE
CERTIFICATE OF CORRECTION

PATENT NO. : 5,537,092
DATED : July 16, 1996
INVENTOR(S) : Yoshiyuki SUZUKI et al.

It is certified that error appears in the above-indentified patent and that said Letters Patent is hereby corrected as shown below:

Claim 8, column 4, line 39, "displayed" should read --display--.

* Claim 13, column 4, line 61, "claim 7" should read --claim 8--.

Signed and Sealed this

Twenty-fifth Day of February, 1997

Attest:

BRUCE LEHMAN

*Attesting Officer*   *Commissioner of Patents and Trademarks*